United States Patent [19]
Vipat

[11] Patent Number: 5,143,619
[45] Date of Patent: Sep. 1, 1992

[54] SECONDARY TREATMENT OF AN INTEGRATED PAPER MILL EFFLUENT

[75] Inventor: Vasudha S. Vipat, Burnaby, Canada

[73] Assignee: MacMillan Bloedel Limited, Canada

[21] Appl. No.: 698,032

[22] Filed: May 10, 1991

[51] Int. Cl.$^5$ .............................................. C02F 3/12
[52] U.S. Cl. ..................... 210/624; 210/631; 210/928; 210/908
[58] Field of Search ............ 210/620, 621, 622, 623, 210/624, 625, 626, 631, 691, 908, 909, 928; 162/29, 30.11, 31, 33, 16

[56] References Cited

U.S. PATENT DOCUMENTS

| | | | |
|---|---|---|---|
| 4,030,968 | 6/1977 | Goel et al. ............................ | 162/29 |
| 4,374,027 | 2/1983 | Severeid et al. ...................... | 162/29 |
| 4,420,369 | 12/1983 | Eaton et al. ........................... | 162/29 |
| 4,490,257 | 12/1984 | Becker .................................. | 162/29 |
| 5,013,454 | 5/1991 | Hynninen ............................. | 162/29 |

Primary Examiner—Stanley S. Silverman
Assistant Examiner—Neil M. McCarthy
Attorney, Agent, or Firm—C. A. Rowley

[57] ABSTRACT

In treating effluent from an integrated paper mill having bleach plant effluent (including kraft mill effluent) and paper mill effluent (including effluent from a mechanical pulp mill) it has been found that if the two effluents are separately biologically treated and the recycled activated sludge directed to treatment of the bleach plant kraft mill effluent contains a significant portion of activated sludge derived from the treatment of the paper mill effluent that a significantly higher percentage of the absorbable organic halogens (AOX) can be removed from the bleach plant effluent.

18 Claims, 1 Drawing Sheet

1

SECONDARY TREATMENT OF AN INTEGRATED PAPER MILL EFFLUENT

FIELD OF THE INVENTION

The present invention relates to biological treatment of effluents from an integrated paper mill wherein the removal of absorbable organic halogen (AOX) is enhanced.

BACKGROUND OF THE INVENTION

Pollution abatement is a very serious matter in the pulp and paper industry and it is important to both the paper producers and to the ecology that the waste materials discharging from the mill be maintained at a minimum and preferably eliminated. However, for practical purposes it seems to be substantially impossible to eliminate all discharges from the mill.

Currently adsorbable organic halogens (AOX) are considered an undesirable class of compounds contained in the discharge (a small fraction has been found toxic to fish). Thus reduction of AOX in the effluent to lowest possible level is desirable.

There are various schemes for reduction of AOX which include substitution of chlorine dioxide $ClO_2$ for chlorine ($Cl_2$) in the bleaching sequence and by the use of extended delignification in the kraft process followed by bleaching using oxygen, etc. to eliminate $Cl_2$ and minimize the amount of $ClO_2$ used in bleaching and thus substantially eliminate the chlorine from the effluent.

Various techniques have been employed for removal of the AOX evolving from the $ClO_2$ from the effluent. These techniques include ultra filtration, chemical precipitation/coagulation, ozonation, UV radiation, etc. but all of these techniques are relatively expensive and in many cases not particularly effective.

One of the most widely used methods of AOX removal is by secondary treatment systems which include aerated stabilization basins or lagoons, activated sludge processes, anaerobic/aerobic systems and fungal systems. Fungal systems are the most effective but these have only been used on a lab scale.

In most secondary treatment systems the removal mechanisms employed include air stripping of the volatile AOX and bio-degradation.

BRIEF DESCRIPTION OF THE PRESENT INVENTION

It is an object of the present invention to provide an improved system for secondary treatment of effluent from an integrated paper mill.

Broadly the present invention relates to an activated sludge treatment system for an integrated paper mill having a first source of effluent containing BOD and AOX and a second source of effluent containing BOD but substantially free of AOX comprising separately treating said first and said second effluents with activated sludge, said first effluent being treated for a preselected hydraulic retention time sufficient to substantially complete bio-degradation of said BOD and to permit "bio-adsorption" of AOX but for a time insufficient to permit significant release of "bio-adsorbed" AOX and then separating said first effluent treated for said preselected retention time into a clarified liquor and a first sludge, treating said second effluent for a selected retention time sufficient to substantially complete bio-degradation of BOD in said second effluent, then separating said second effluent treated for said selected retention time into a second clarified liquor and a second sludge, returning significant portions of said first sludge and second sludge to said first treatment stage whereby treatment of said first effluent by a combination of said first and said second sludges permits a significant portion of said second sludge to remove AOX from said first effluent by "bio-adsorption".

Preferably separation of said first effluent into a first liquor and first sludge and separation of said second treated effluent into a second liquor and a second sludge will be combined in a single stage to produce a combined liquor containing said first and second liquor and a combined sludge containing said first and second sludge and wherein a significant portion of said combined sludge will be returned to said first stage to provide said significant portions of said first and second sludges.

Preferably the ratio of first sludge to said second sludge in said significant portions returned to treatment of said first stage will be greater than 1 to 6 and more preferably will be about 1 to 2.

Preferably the hydraulic retention time in said first stage is less than 20 hours and more preferably less than 15 hours.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
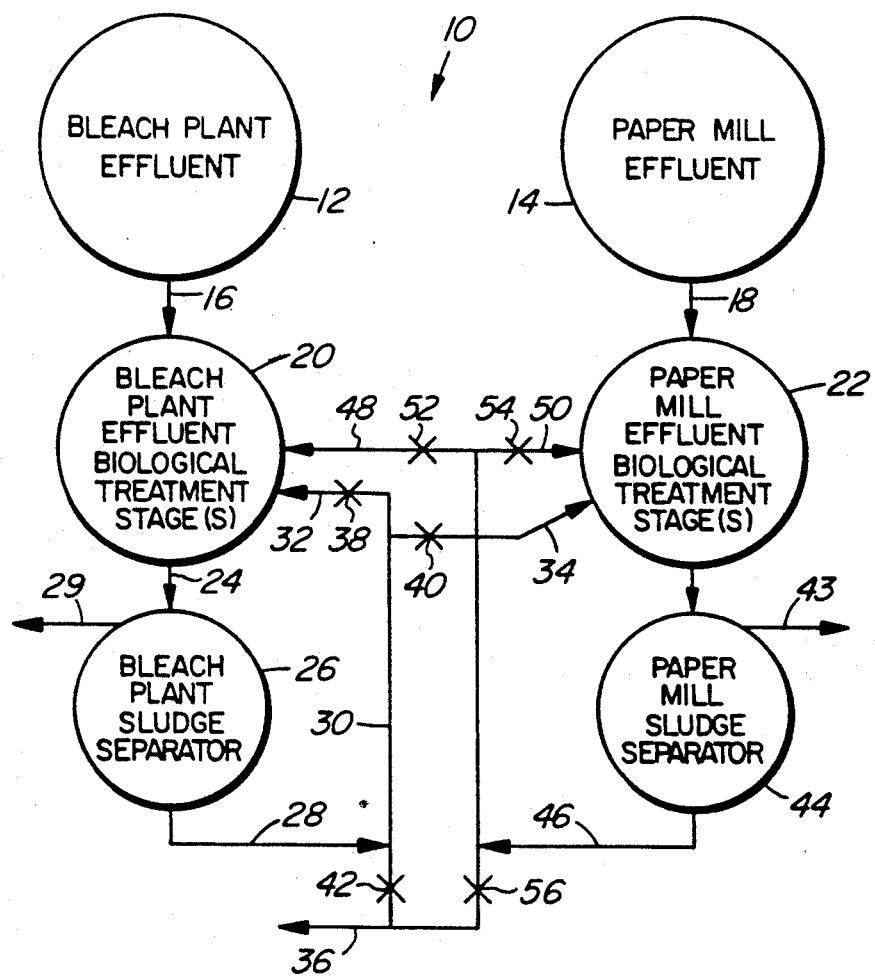
FIG. 1 is a schematic illustration of a secondary recovery system incorporating the present invention and utilizing two separate sludge clarifiers or separators.

In the integrated paper mill effluent treating system 10 illustrated in FIG. 1 the bleach plant effluent is collected as indicated at 12. This bleach plant effluent will normally be effluent from the kraft mill however if halogen compounds (chlorine compounds) are used in bleaching of mechanical pulps used in the integrated mill, the effluent from the mechanical bleach plant will also be fed to the bleach plant effluent collector 12.

Halogen or chlorine free effluent from the paper mill and generally from the mechanical pulping operations will be collected in the paper mill effluent collector 14 that is maintained separate from the bleach plant effluent collector 12.

These effluents from their respective collectors 12 and 14 are fed as indicated by lines 16 and 18 respectively to their respective biological treatment stage(s) as indicated at 20 and 22 respectively. The effluent being treated in either the stages 20 and 22 is retained within these stages for a selected period of time (hydraulic retention time (HRT) which may be different for the bleach plant effluent and the paper mill effluent. Furthermore, these biological treatment stages may be made up of one or more treatment tanks to provide the required HRT.

Decanted liquid from the biological treatment stage 20 is fed via line 24 to a bleach plant sludge separator 26 from which a sludge is withdrawn as indicated by arrow 28 with liquid discharge leaving as indicated by line 29. A portion of this sludge is recirculated as indicated by line 30 and 32 to the biological treatment stage 20 and if desired some may be directed to the paper mill effluent biological treatment stage 22 as indicated by line 34. The excess of the sludge is directed to line 36 which carries the excess sludge to an incinerator for disposal. The flows to lines 32, 34 and 36 are controllable by valves 38, 40 and 42 respectively to provide complete control over the relative flows through the lines 32, 34 and 36.

Similarly the liquid overflowing the biological treatment stage 22 which like stage 20 may be made of a plurality of different tanks to provide the requisite HRT is fed to the paper mill sludge separator 44 and sludge separated from the decanted liquor in line 43 is carried via line 46 and line 48 to the biological treatment stage 20 for the bleach plant effluent and via line 50 a portion thereof is returned to the treatment stage 22. Excess sludge material is fed to line 36 for incineration. Flows through or to the lines 48, 50 and 36 are controlled by valves 52, 54 and 56 respectively (where the term valves are used, the control of flow may be by any suitable means which may include separate pumps, thus the valves 38, 40, 42, 52, 54 and 56 may comprise any system for adjusting or apportioning the flows in the various lines).

In carrying out the present invention it is important that a significant amount of paper mill sludge in line 46 be directed via line 48 into the treatment stage 20. It is also important that a portion of the sludge returned to the treatment stage 20 be acclimatized sludge from the bleach plant separator 26.

The AOX present in the treatment stage 20 is removed hydraulically by two mechanisms (a portion of the AOX is carried off in the air, however this is a relatively small percentage) namely by bio-degradation and what applicant defines as "bio-adsorption" which means adsorption of AOX onto and carried with the micro-organisms from the treatment stage.

Applicant has found that it is possible to separate substantially equivalent amounts of AOX by bio-degradation and "bio-adsorption".

To maximize "bio-adsorption" it is important that the retention time HRT within the stages 20 be sufficient to permit the bio-degradation and "bio-adsorption" to be substantially complete, but not be excessive as the "bio-adsorbed" AOX tends to be released, i.e. it is believed it separates from the micro-organisms when the HRT is too long. Applicant has found that retention times of 15 hours are effective and that a significant portion of the AOX removed will be removed, it is believed, by being bio-adsorbed by the micro-organisms and can be separated in the separator 26. As retention times of 20 hours are approached "bio-adsorption" begins to fall off with many effluents.

A continuous "bio-adsorption" process requires that at least a significant portion of the sludge fed to the treatment stage 20 not be saturated with "bio-adsorbed" AOX. It has been found to be important that a portion of the sludge fed to the treatment stage 20 be obtained from a source other than the sludge separator 26 to improve the capability for "bio-adsorption". A ratio of 1 part sludge from separator 26 and 2 parts sludge from the separator 44 fed to the treatment stage 20 has been found to produce good results obtaining about 20 percent of the AOX removal as bio-degraded AOX and a further 20 percent as "bio-adsorbed" in the sludge. It will be apparent that the optimum ratio of paper mill sludge to bleach plant sludge may vary from one mill to another, however it is believed to be important to maintain a certain amount of acclimatized organisms in the sludge returned to the treatment stage 20 to ensure good efficiency in the bio-degradation of the AOX and unacclimatized organisms be present to improve "bio-adsorption".

It will be apparent that the effluent from the bleach plant contains not only AOX but also has a bio-chemical demand (BOD) which is reduced by the organisms in the treatment stage 20. Removal of BOD is facilitated by the recycle or reuse of acclimatized organisms.

The treatment stage 22 is primarily for the purpose of reducing the bio-chemical oxygen demand (BOD) and thus need only receive sludge from line 50 since all this sludge is derived from the separator 44 and is acclimatized to the treatment occurring in the treatment stage 22. However, it may occur that the demand by the treatment stage 20 for unacclimatized sludge to facilitate "bio-adsorption" reduces the amount of sludge from separator 44 available for line 50 and that this sludge must be supplemented with sludge from separator 26 hence the provision of line 34 and control valve 40.

The temperature of the treatments 20 and 22 do not seem to have a marked influence on the required retention times. Temperatures in the range of 6° to 27° C. have been encountered and the effective HTR was not significantly influenced.

The amount of sludges fed to each of the stages 20 and 22 is determined by conventional practice in accordance with available oxygen, etc.

It will be apparent that the actual flows of lines 16 and 18 will depend on the particular integrated paper mill effluent to be recovered, i.e. it is the ratio of chemical pulp (kraft pulp), how much bleaching is being done, etc. to mechanical pulping that the materials fed to the collectors 12 and 14 respectively. The system of FIG. 1 permits optimizing of the various flows to obtain the optimum AOX removal based on the available sludges.

Figure 2:
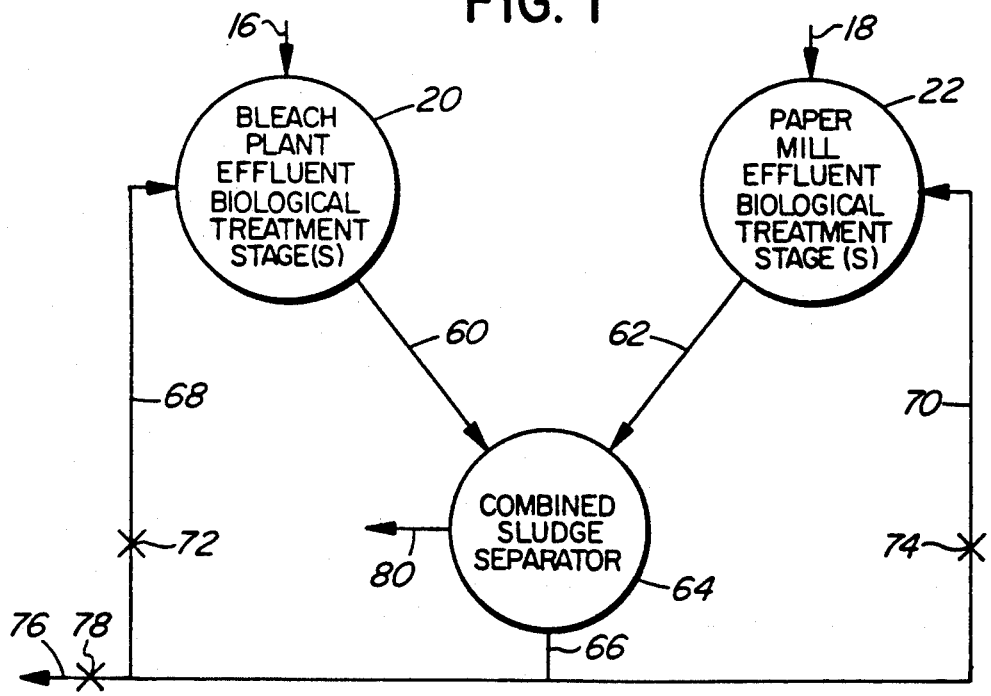
FIG. 2 is a schematic illustration similar to FIG. 1 but incorporating a combined sludge clarifier or separator.

FIG. 2 shows a simplified version wherein the overflow from the biological treatment stage 20 and 22 flow via lines 60 and 62 respectively to a common sludge separator or clarifier 64. The sludge from the separator will automatically contain a mixture of bleach plant sludge and paper mill sludge and in proportion to the inputs via lines 16 and 18. The mixture of these sludges leaving the combined sludge separator via line 66 may be returned via line 68 and 70 to the treatment stages 20 and 22 respectively in amounts controlled by the valves 72 and 74 respectively with the excess being directed via line 76 to incineration. The valve 78 aids in control balancing of the flows. The decanted liquid is discharged from the separator 64 as indicated by line 80.

The HRT in the treatment stage 20 should not exceed about 20 hours for significant reductions in the "bio-adsorbed" material carried to the clarifier 26 (or 64) may be encountered. The HRT in the treatment stage 22 is not as critical since there is no bio-degradation or "bio-adsorption" of AOX as there being no AOX in that system. Thus the HRT is set to that required to ensure proper BOD removal.

It will be apparent that in a conventional system where both effluents are treated separately and there is no provision for a cross flow of effluent from the paper mill treatment to the bleach plant treatment stages that the bio-adsorbed material will not be removed as effectively. Similarly if the HRT in stage 20 is too long the bio-adsorbed material may be lost.

EXAMPLE

In comparing two different systems, one incorporating the present invention and one treating essentially the same waste but without the injection of paper mill sludge into the treatment stage for the bleach plant effluent, it was found in a test over approximately 25 days using HRT of 14 hours that the percentage AOX removed using the prior art technique was about 25% whereas the percent AOX removed when practising the present invention was in the order of 52%. The ratio of acclimatized sludge (separator 26) to sludge from the paper mill (separator 44) was 1 to 2.

Having described the invention, modifications will be evident to those skilled in the art without departing from the spirit of the invention as defined in the appended claims.

I claim:

1. An activated sludge treatment system for an integrated paper mill having a first source of effluent containing BOD and AOX and a second source of effluent containing BOD but substantially free of AOX comprising separately treating said first and said second effluents with activated sludge, said first effluent being treated for a preselected hydraulic retention time sufficient to substantially complete bio-degradation of said BOD and to permit bio-adsorption of AOX but for a time insufficient to permit significant release of bio-adsorbed AOX and then separating said first effluent treated for said preselected retention time into a clarified liquor and a first sludge, treating said second effluent for a selected retention time sufficient to substantially complete bio-degradation of BOD in said second effluent, then separating said second effluent treated for said selected retention time into a second clarified liquor and a second sludge, returning at least a portion of said first sludge and a portion of said second sludge to said first treatment stage in relative amounts so that treatment of said first effluent by a combination of said first and said second sludges permits said portion of said second sludge to remove AOX from said first effluent by bio-adsorption.

2. An activated sludge treatment system for an integrated paper mill having a first source of effluent containing BOD and AOX and a second source of effluent containing BOD but substantially free of AOX comprising separately treating said first and said second effluents with activated sludge, said first effluent being treated for a preselected hydraulic retention time sufficient to substantially complete bio-degradation of said BOD and to permit bio-adsorption of AOX but for a time insufficient to permit significant release of bio-adsorbed AOX, treating said second effluent for a selected retention time sufficient to substantially complete bio-degradation of BOD in said second effluent, combining said first and said second effluents treated for said selected retention times to form combined treated effluent liquor and separating said combined treated effluent liquor into a combined clarified liquor and a combined sludge and returning a portion of said combined sludge to said first stage.

3. A process as defined in claim 1 wherein the ratio of first sludge to said second sludge in said significant portions returned to treatment of said first stage is greater than 1 to 6.

4. process as defined in claim 2 wherein the ratio of sludge from said first effluent to sludge from said second effluent in said combined sludge is greater than 1 to 6.

5. A process as defined in claim 3 wherein the ratio of said first sludge to said second sludge is about 1 to 2.

6. A process as defined in claim 4 wherein the ratio of said first sludge to said second sludge is about 1 to 2.

7. A process as defined in claim 1 wherein said hydraulic retention time in said first stage is less than 20 hours.

8. A process as defined in claim 2 wherein said hydraulic retention time in said first stage is less than 20 hours.

9. A process as defined in claim 3 wherein said hydraulic retention time in said first stage is less than 20 hours.

10. A process as defined in claim 4 wherein said hydraulic retention time in said first stage is less than 20 hours.

11. A process as defined in claim 5 wherein said hydraulic retention time in said first stage is less than 20 hours.

12. A process as defined in claim 6 wherein said hydraulic retention time in said first stage is less than 20 hours.

13. A process as defined in claim 1 wherein said hydraulic retention time in said first stage is less than 15 hours.

14. A process as defined in claim 2 wherein said hydraulic retention time in said first stage is less than 15 hours.

15. A process as defined in claim 3 wherein said hydraulic retention time in said first stage is less than 15 hours.

16. A process as defined in claim 4 wherein said hydraulic retention time in said first stage is less than 15 hours.

17. A process as defined in claim 5 wherein said hydraulic retention time in said first stage is less than 15 hours.

18. A process as defined in claim 6 wherein said hydraulic retention time in said first stage is less than 15 hours.

* * * * *